United States Patent
Roitshtein et al.

(10) Patent No.: US 10,015,112 B2
(45) Date of Patent: Jul. 3, 2018

(54) MEMORY-EFFICIENT HANDLING OF MULTICAST TRAFFIC

(71) Applicant: Mellanox Technologies TLV Ltd., Raanana (IL)

(72) Inventors: Amir Roitshtein, Holon (IL); Niv Aibester, Herzliya (IL); Barak Gafni, Kfar Malal (IL); George Elias, Tel Aviv (IL)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 219 days.

(21) Appl. No.: 14/961,923

(22) Filed: Dec. 8, 2015

(65) Prior Publication Data

US 2017/0163567 A1  Jun. 8, 2017

(51) Int. Cl.
*H04L 12/931* (2013.01)
*H04L 12/861* (2013.01)
*H04L 12/741* (2013.01)

(52) U.S. Cl.
CPC .......... *H04L 49/201* (2013.01); *H04L 49/205* (2013.01); *H04L 49/9005* (2013.01); *H04L 45/745* (2013.01)

(58) Field of Classification Search
None
See application file for complete search history.

(56) References Cited

U.S. PATENT DOCUMENTS

| | | | |
|---|---|---|---|
| 6,233,244 B1 * | 5/2001 | Runaldue | G06F 5/06 370/412 |
| 6,542,502 B1 * | 4/2003 | Herring | H04L 45/40 370/390 |
| 7,936,753 B1 | 5/2011 | Colloff et al. | |
| 8,050,263 B1 * | 11/2011 | Walsh | H04L 12/1886 370/390 |
| 2002/0075871 A1 * | 6/2002 | Blanc | H04L 49/201 370/390 |
| 2006/0114848 A1 | 6/2006 | Eberle et al. | |
| 2007/0291755 A1 * | 12/2007 | Cheng | H04L 45/16 370/390 |
| 2009/0073978 A1 * | 3/2009 | Craddock | H04L 45/16 370/390 |
| 2009/0141740 A1 * | 6/2009 | Baruah | H04L 47/10 370/469 |
| 2013/0250762 A1 | 9/2013 | Assarpour | |
| 2016/0337258 A1 * | 11/2016 | Attar | H04L 49/3036 |
| 2017/0063613 A1 | 3/2017 | Bloch et al. | |

* cited by examiner

*Primary Examiner* — Charles C Jiang
*Assistant Examiner* — George Atkins, Jr.
(74) *Attorney, Agent, or Firm* — D. Kligler IP Services Ltd.

(57) ABSTRACT

Communication apparatus includes multiple interfaces connected to a packet data network. A memory is coupled to the interfaces and configured as a buffer to contain packets received through ingress interfaces while awaiting transmission to the network via respective egress interfaces. Packet processing logic is configured, upon receipt of a multicast packet through an ingress interface, to identify a number of the egress interfaces through which respective copies of the multicast packet are to be transmitted, to allocate a space in the buffer for storage of a single copy of the multicast packet, to replicate and transmit multiple copies of the stored copy of the multicast packet through the egress interfaces, to maintain a count of the replicated copies that have been transmitted, and when the count reaches the identified number, to release the allocated space in the buffer.

10 Claims, 3 Drawing Sheets

MEMORY-EFFICIENT HANDLING OF MULTICAST TRAFFIC

FIELD OF THE INVENTION

The present invention relates generally to packet communication networks, and particularly to methods and apparatus for forwarding of multicast packets in such networks.

BACKGROUND

Switches used in high-speed packet networks, such as Ethernet and InfiniBand networks, typically contain buffer memories. Packets received by the switch through one of its interfaces are stored temporarily in a buffer memory while awaiting transfer to the appropriate egress interface or possibly, in the case of multicast packets, to multiple egress interfaces. Although buffer memory may be allocated statically to each interface, many modern packet switches use a shared memory, in which buffer space is allocated dynamically to different interfaces and queues depending on traffic load and memory availability.

As one example, U.S. Patent Application Publication 2013/0250762 describes a method for achieving lossless behavior for multiple ports sharing a buffer pool. Packets are "colored" and stored in a shared packet buffer without assigning fixed page allocations per port.

SUMMARY

Embodiments of the present invention that are described hereinbelow provide improved methods and apparatus for buffer allocation in a switch.

There is therefore provided, in accordance with an embodiment of the invention, communication apparatus, including multiple interfaces configured to be connected to a packet data network so as to serve as both ingress and egress interfaces in receiving and forwarding of data packets from and to the network by the apparatus. A memory is coupled to the interfaces and configured as a buffer to contain packets received through the ingress interfaces while awaiting transmission to the network via respective ones of the egress interfaces. Packet processing logic is configured, upon receipt of a multicast packet through an ingress interface, to identify a number of the egress interfaces through which respective copies of the multicast packet are to be transmitted, to allocate a space in the buffer for storage of a single copy of the multicast packet, to replicate and transmit multiple copies of the stored copy of the multicast packet through the egress interfaces, to maintain a count of the replicated copies that have been transmitted, and when the count reaches the identified number, to release the allocated space in the buffer, and to release the accounting of the buffer.

In a disclosed embodiment, the packet processing logic is configured, upon receipt of the multicast packet, to set a counter to a value corresponding to the specified number of the egress interfaces, and to decrement the value each time one of the replicated copies is transmitted.

In some embodiments, the packet processing logic is configured to transmit the multiple copies at two or more different levels of quality of service (QoS), such that a first number of the copies is transmitted at a first level of the QoS and a second number of the copies is transmitted at a different, second level of the QoS, and the packet processing logic is configured to count the replicated copies of the packet that have been transmitted respectively at the first and second levels of the QoS, and to release the allocated space when both the first and second numbers of the copies have been transmitted.

In a disclosed embodiment, the packet processing logic includes multiple packet transmission units, which are coupled respectively to the interfaces and are configured to read the stored copy of the multicast packet from the buffer and replicate the copies of the multicast packet for transmission through the egress interfaces. A central buffer management unit is configured to receive signals from the packet transmission units upon the transmission of the copies through the egress interfaces and to maintain the count responsively to the received signals. Typically, the packet processing logic is configured to generate descriptors indicative respectively of the copies of the multicast packets that are to be transmitted through the egress interfaces and to queue the descriptors in respective queues for execution by the packet transmission units.

Additionally or alternatively, the packet processing logic is configured, upon receipt of a unicast packet through one of the interfaces, to allocate a further space in the buffer for storage of the unicast packet, along with the space allocated for the single copy of the multicast packet, and when the unicast packet has been transmitted through a designated egress interface, to release the allocated further space in the buffer.

There is also provided, in accordance with an embodiment of the invention, a method for communication, which includes receiving a multicast packet from a network through an ingress interface of a network element. A space is allocated in a buffer in the network element for storing a single copy of the multicast packet. A number of egress interfaces of the network element through which respective copies of the multicast packet are to be transmitted is identified. Multiple copies of the stored copy of the multicast packet are replicated and transmitted through the egress interfaces, while maintaining a count of the replicated copies that have been transmitted. The allocated space in the buffer is released when the count reaches the identified number.

The present invention will be more fully understood from the following detailed description of the embodiments thereof, taken together with the drawings in which:

DETAILED DESCRIPTION OF EMBODIMENTS

Figure 1:
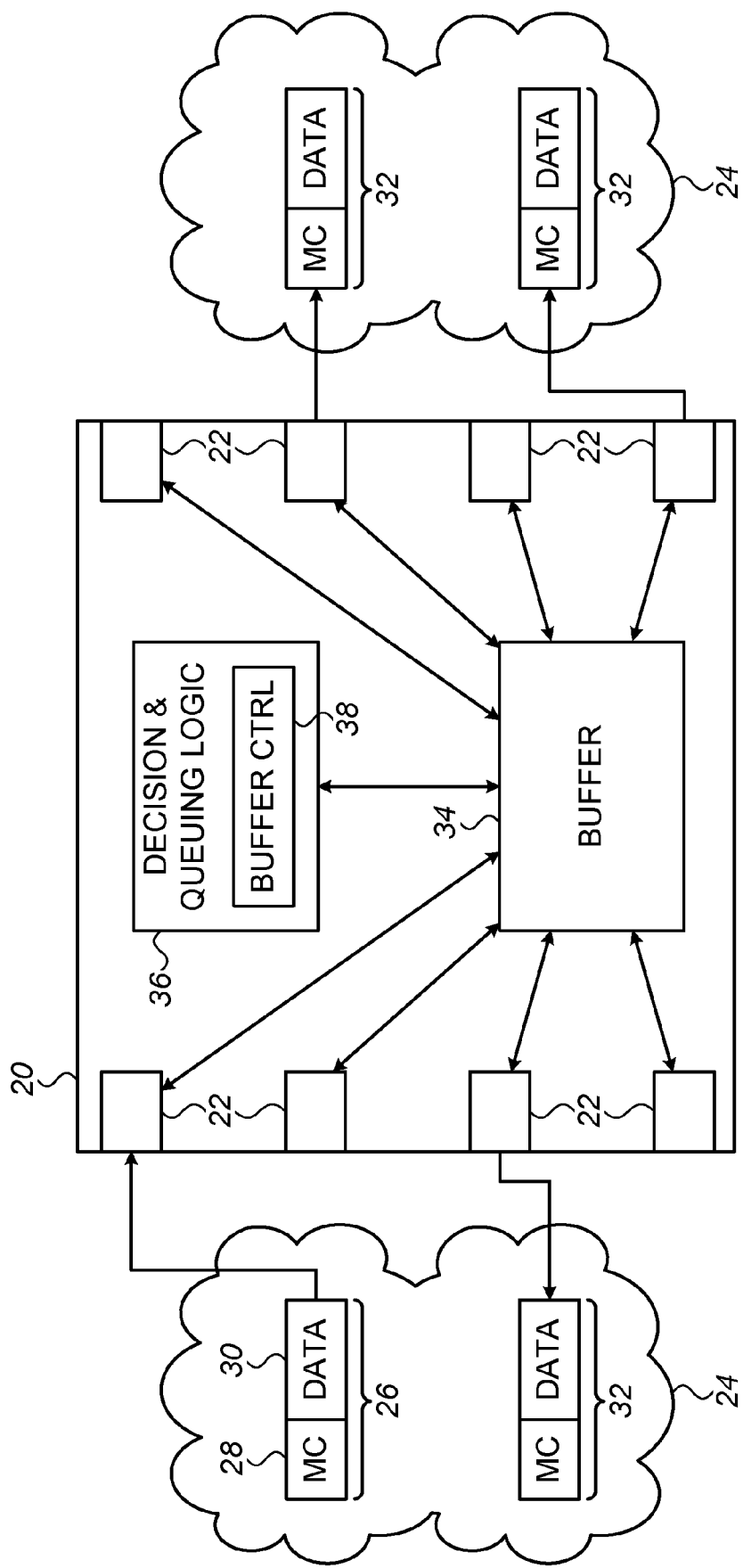
FIG. 1 is a block diagram that schematically illustrates a switch with a shared buffer, in accordance with an embodiment of the invention.

Handling and forwarding of multicast traffic in a high-speed network switch places heavy demands on buffers and buffer management logic. When a switch receives a multicast packet from the network, the switch is frequently required to replicate and forward copies of the packet through multiple egress interfaces. To complicate matters further, the switch may be required to make different modifications to different copies of the packet before forwarding. As a result, the packet processing logic in the switch will often allocate buffer space for a given multicast packet in proportion to the number of times the packet is to be replicated. This approach simplifies the logic required to handle multicast packets but can waste substantial memory space in the switch.

Embodiments of the present invention that are described herein provide techniques for handling of multicast packets, and specifically for accounting of buffer space in a switch, that facilitate more accurate and efficient handling of available memory. In the disclosed embodiments, buffer control logic in the switch allocates buffer space for only a single copy of each multicast packet (and no more than this single copy) even when multiple copies are to be forwarded through different egress interfaces. The buffer control logic keeps track of the number of copies of the packet that are to be transmitted, as well as the number of copies that actually have been transmitted, in order to track the need for buffer space and release the buffer space when all copies have been transmitted.

Embodiments of the present invention are typically implemented in communication apparatus that comprises multiple interfaces, such as a network switch with multiple ports, connected to a packet data network. The interfaces serve as both ingress and egress interfaces in receiving and forwarding of data packets from and to the network by the apparatus. A memory within the apparatus, coupled to the interfaces, serves as a buffer to contain packets received through the ingress interfaces while the packets await transmission to the network via the appropriate egress interfaces. In the disclosed embodiments, the memory is configured as a shared buffer and is used for both unicast and multicast packets, although different accounting mechanisms are used to track and release the allocations of buffer space used by the different packet types. Alternatively, the principles of the present invention may similarly be implemented in network elements that use separate buffers for unicast and multicast packets, as well as network elements that do not use shared buffers at all.

Upon receipt of a multicast packet through an ingress interface, packet processing logic in the apparatus identifies and counts the number of egress interfaces through which respective copies of the multicast packet are to be transmitted, but allocates space in the shared buffer for storage of only a single copy, as noted above. The packet processing logic replicates and sends multiple copies of the stored copy of the multicast packet through the egress interfaces and maintains a count of the replicated copies that have been sent. In the disclosed embodiments, the count is maintained centrally; but alternatively, the count may be stored in another location and may be updated each time a packet copy is sent or after sending a certain number of packets. (The logic may either count up to the identified number or, equivalently, may set an initial counter value to the identified number and count down to zero.) When the count reaches the number of required copies that was identified initially, the packet processing logic releases the allocated space in the shared buffer, so that the buffer space can be reused.

Maintaining such a count of transmitted copies of the multicast packet is complicated by the fact that each egress interface has its own queue, which determines when the respective copy will actually be transmitted. The space allocated to store the single copy of the incoming packet should be preserved until all copies have been transmitted. Furthermore, in some cases, the copies of the multicast packet are transmitted through the egress ports at two or more different levels of quality of service (QoS), each with its own queue and its own count of copies to be transmitted. Mechanisms for maintaining the counts of transmitted packet replicas and efficiently managing the allocation and release of buffer space under these circumstances are described in greater detail hereinbelow.

FIG. 1 is a block diagram that schematically illustrates a network switch 20 with a shared buffer, in accordance with an embodiment of the invention. Switch 20 comprises multiple interfaces, in the form of ports 22, which are connected to a packet data network 24 and typically serve as both ingress and egress interfaces. (Although only eight ports 22 are shown in FIG. 1 for the sake of simplicity, in practice switch 20 may typically have a substantially larger number of ports, or possibly fewer ports.) A memory 34, coupled to ports 22, is configured as a shared buffer to contain packets that are assigned to multiple queues for transmission to the network, including both unicast and multicast packets.

In the pictured embodiment, switch 20 receives a multicast packet 26 through an ingress port 22. Packet 26 comprises a header 28 bearing a multicast address and a data payload 30. Header 28 may comprise, for example, a Layer 2 header with a multicast MAC address or a Layer 3 header with a multicast IP address. Alternatively, a given packet may receive multicast treatment, as described hereinbelow, if it is to be sent to multiple unicast destinations (for example, if the packet address indicates a unicast destination that is unknown), or if multiple descriptors are generated in switch 20 for handling the packet (except in cases of mirroring or trapping of packets or other special indications). Port 22 directs packet 26 to memory 34, where a copy of the packet is stored while awaiting retransmission through the appropriate egress ports 22. Packet processing logic (referred to in this embodiment as decision and queuing logic 36) reads header 28 and looks up the multicast address in order to identify and count the egress ports 22 through which respective copies 32 of packet 26 are to be transmitted.

Meanwhile, buffer control logic 38 allocates space in the shared buffer in memory 34 for storage of a single copy of the multicast packet. (Buffer control logic 38 is considered to be a part of the packet processing logic for purposes of the present description and the claims, although in practice it may be implemented separately from decision and queuing logic 36.) Logic 36 queues, replicates, and transmit multiple copies 32 of the multicast packet through egress interfaces 22 while maintaining a count, in buffer control logic 38, of the replicated copies that have been transmitted. When the count reaches the identified number, handling of the multicast packet is completed, and buffer control logic 38 releases the allocated space in memory 34 so that it can be used for further incoming packets. As a result of this buffering and accounting scheme, switch 20 makes efficient use of available buffer space in memory 34 and is thus able to transmit a much larger volume of multicast traffic than it must actually store in the buffer at any given time. In other words, given a multicast packet of size S bytes, which is to be transmitted through n egress ports, switch 20 will transmit a total packet volume of nS bytes, while storing only S bytes in the process.

Figure 2:
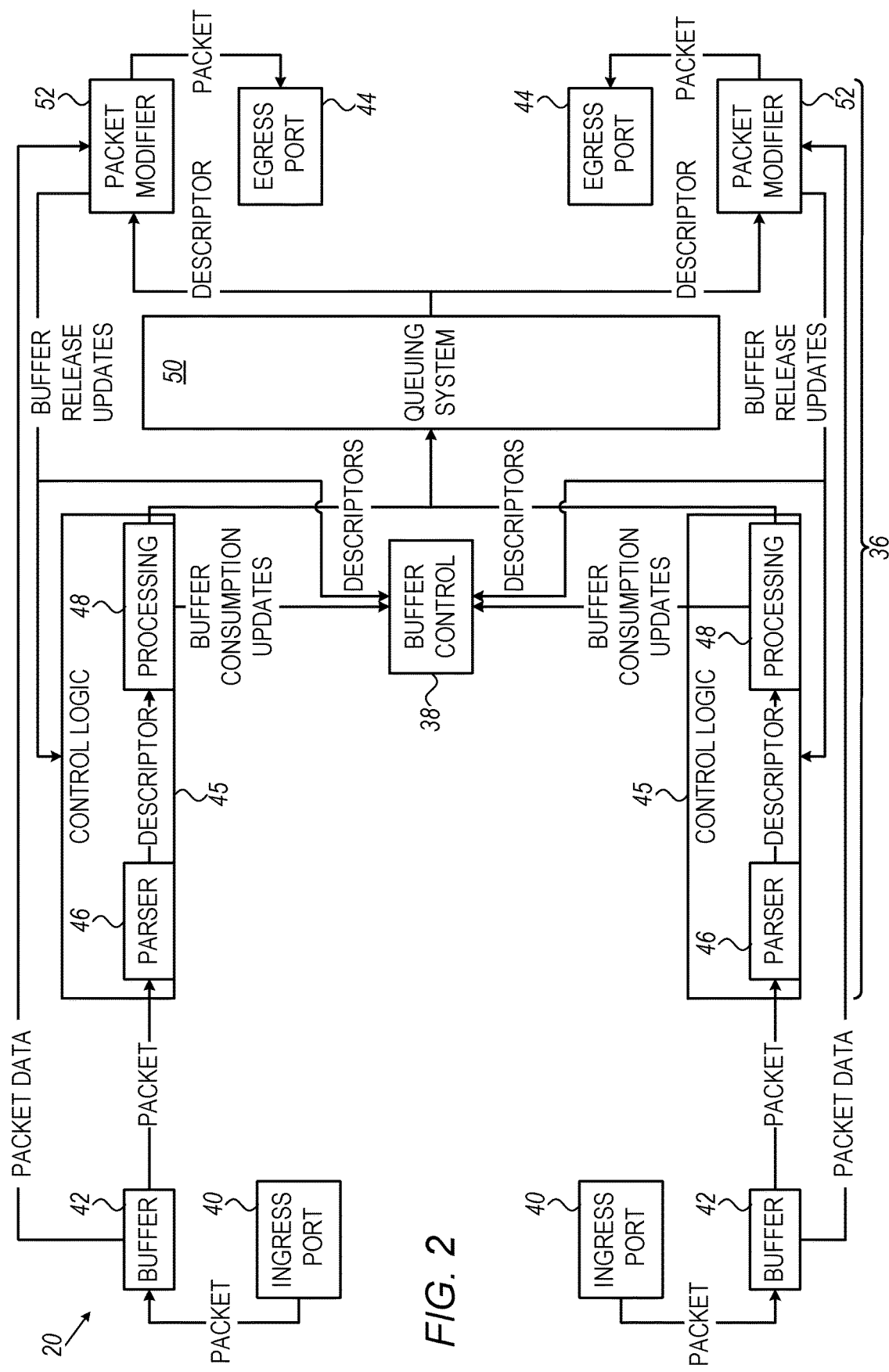
FIG. 2 is a block diagram that schematically shows details of packet processing logic in a switch, in accordance with an embodiment of the invention.

FIG. 2 is a block diagram that schematically shows details of decision and queuing logic 36 in switch 20, in accordance with an embodiment of the invention. For the sake of clarity and concreteness, this figure shows one possible implementation of logic 36, but other implementations will be apparent to those skilled in the art after reading the present description and are considered to be within the scope of the present invention. Although the elements of logic 36 are shown in FIG. 2 as separate functional components, in practice these components can be implemented together in custom or programmable hardware logic within a single chip or chip set.

Upon receiving an incoming packet, whether unicast or multicast, an ingress port 40 (such as one of ports 22 in FIG. 1) places the packet in a buffer 42 in memory 34 and notifies decision control logic 45 that the packet is ready for processing. A parser 46 parses the packet header and generates one or more descriptors, which is passes to a descriptor processor 48 for further handling and generation of forwarding instructions. Based on the descriptors, for example, processor 48 typically determines an egress port or ports 44 through which the packet is to be transmitted. The descriptor may also indicate the quality of service (QoS) to be applied to the packet, i.e., the level of priority for transmission, and any applicable instructions for modification of the packet header. For multicast packets, processor 48 typically generates multiple descriptors, one for each egress port 44 that is to transmit a copy of the packet. All of these descriptors may have the same QoS (indicated, for example, by a QoS index value), or they may be assigned to two or more different QoS levels for different egress ports.

A descriptor processor 48 places the descriptors in the appropriate queues in a queueing system 50, to await transmission via the designated egress ports 44. Typically, queuing system 50 contains a dedicated queue for each egress port 44 or multiple queues per egress port, one for each QoS level. In some implementations, queuing system 50 may generate the multiple copies of multicast packets, rather than or in addition to the operation of processor 48 in this regard.

In addition, processor 48 counts the descriptors that have been generated in order to ascertain how many copies of each received packet are to be transmitted. For unicast packets, the count value will typically be one, except for cases in which control logic 45 is programmed to perform special replications of the packet, such as mirroring and trapping of packets for purposes of communication monitoring and diagnostics. In such cases, processor 48 will set the count value to a number greater than one, although the packet header retains a unicast address. On the other hand, for multicast packets, processor 48 will generally count a higher number of descriptors, corresponding to the number of different egress ports 44 through which copies of the packet are to be transmitted.

Processor 48 passes the descriptor count for each packet to buffer control logic 38, which serves as the central buffer management and accounting unit for memory 34. Buffer control logic 38 increments or decrements a corresponding counter to this value and will subsequently decrement or increment the value occurs when the last replicated copy of the packet is transmitted as long as the counter is non-zero.

When a descriptor reaches the head of its queue, queuing system 50 passes the descriptor to a packet modifier 52 for execution. Packet modifiers 52 are respectively coupled to egress ports 44 and serve as packet transmission units. In response to the descriptor, packet modifier 52 reads and replicates a copy of the appropriate multicast packet data from buffer 42, and makes whatever changes are called for in the packet header for transmission to network 24 through egress port 44.

Upon the transmission of the last packet copy through the corresponding egress port 44, packet modifier 52 signals buffer control logic 38 (and may also signal decision and control logic 45, as indicated in the figure). Logic 38 decrements the copy count in response to each received signal of this sort. When the count reaches zero—meaning that the last copy of the packet has been transmitted—buffer control logic 38 releases buffer 42, so that its location in memory 34 can be overwritten. This memory accounting and management process typically takes place for multiple different packets in parallel at any given time.

Figure 3:
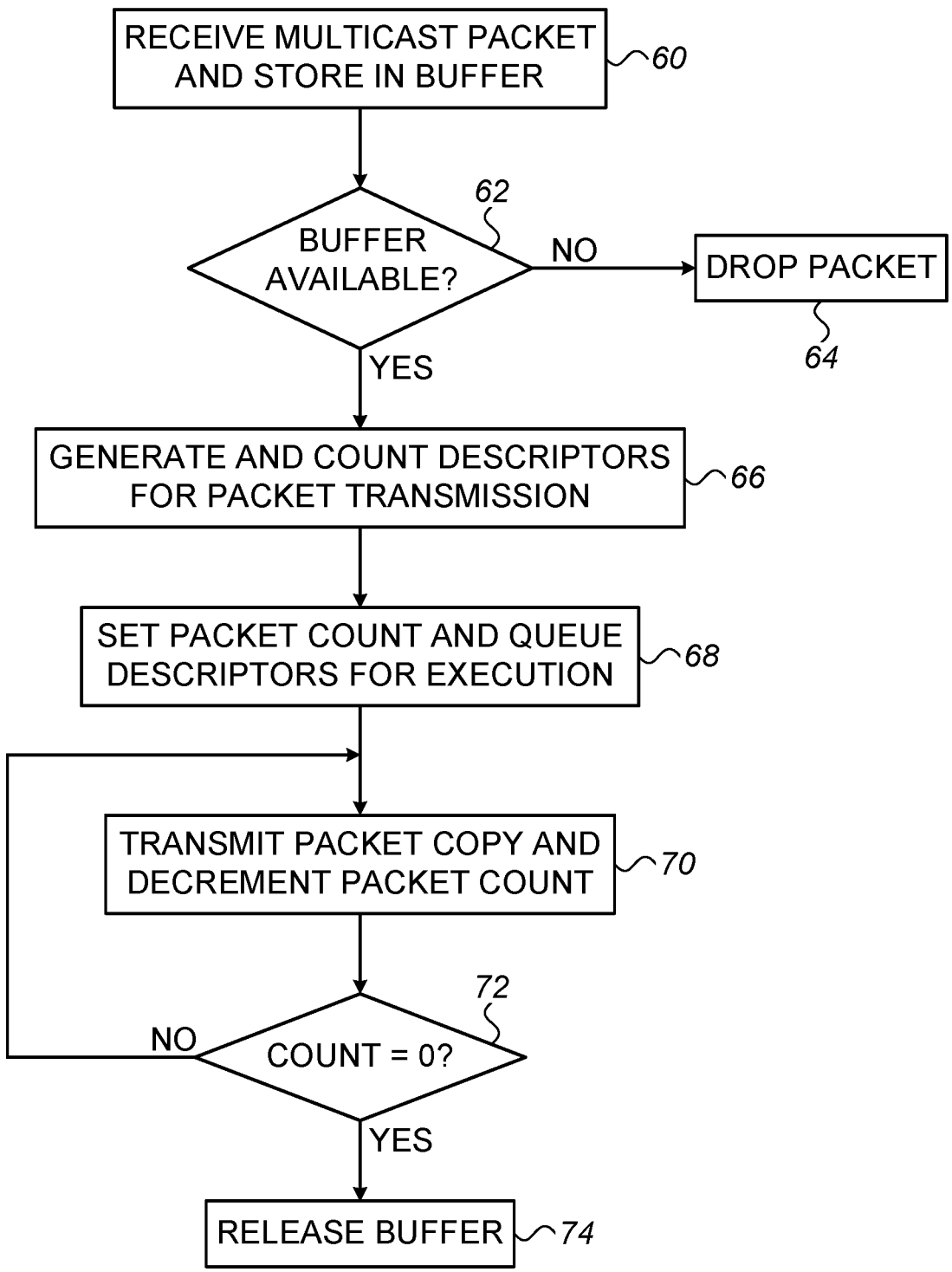
FIG. 3 is a flow chart that schematically illustrates a method for management of a shared buffer, in accordance with an embodiment of the invention.

FIG. 3 is a flow chart that schematically illustrates a method for management of shared buffer space in memory 34, in accordance with an embodiment of the invention. The method is described, for the sake of convenience and clarity, with reference to the elements of switch 20, as illustrated in the preceding figures. It may alternatively be carried out, mutatis mutandis, in other sorts of switches and other communication apparatus having multiple interfaces and multicast forwarding capabilities.

The method is initiated when switch 20 receives multicast packet 26 through one of ports 22, at a packet reception step 60. In one embodiment, a single copy of the packet is stored temporarily is a headroom buffer (which is outside the scope of the present description). As part of the packet input process, buffer control logic 38 (or another logical element in switch 20) checks whether there is space available in memory 34 for the packet, at a buffer checking step 62. Typically, each ingress port 40 is allocated a certain quota of buffer space, which can increase and decrease depending upon the overall occupancy level of the memory. When the buffer quota is exceeded, control logic 45 drops the packet, at a packet rejection step 64. Efficient management of memory space, as described herein, reduces the likelihood of this sort of occurrence.

Decision control logic 45 processes the received multicast packet and generates descriptors for all of the copies that are to be transmitted, at a descriptor generation step 66. Logic 45 counts the descriptors for each packet, or optionally, when packet copies are to be transmitted at multiple different QoS levels, generates a separate count for each applicable QoS level. Logic 45 queues the descriptors in queuing system 50, and passes the count value(s) to buffer control logic 38, at a descriptor queuing step 68. Alternatively, in order to simplify accounting, logic 45 may apply the same QoS index to all copies of a given multicast packet (for example, the QoS index of the first replica), so that buffer control logic 38 need maintain only a single count for each multicast packet.

Queuing system 50 passes descriptors to the appropriate packet modifiers 52, which generate corresponding copies 32 of the packet for transmission through egress ports 44, at a packet transmission step 70. As the last copy is transmitted, packet modifier 52 signals buffer controller 38, which decrements the corresponding packet count. Buffer controller 38 checks the remaining count value, at a count checking step 72. When the count reaches zero, all copies have been sent, and buffer controller 38 releases buffer 42, at a buffer release step 74.

Although the present description relates, for the sake of concreteness and clarity, to the specific switch 20 that is shown in FIG. 1, the principles of the present invention may similarly be applied, mutatis mutandis, to any network element that uses a shared buffer and implements the sorts of multicast forwarding techniques that are described herein. Thus, in alternative embodiments, these principles may be applied not only in different types of switching apparatus, such as routers and bridges, but also, for example, in advanced network interface controllers that connect a host computer to a network.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A communication apparatus, comprising:
multiple interfaces configured to be connected to a packet data network so as to serve as both ingress and egress interfaces in receiving and forwarding of data packets from and to the network by the apparatus;
a memory coupled to the interfaces and configured as a buffer to contain packets received through the ingress interfaces while awaiting transmission to the network via respective ones of the egress interfaces; and
packet processing logic, which is configured, upon receipt of a multicast packet through an ingress interface, to identify a number of the egress interfaces through which respective copies of the multicast packet are to be transmitted, to generate for each of the identified egress interfaces a descriptor including a quality of service (QoS) index value indicating a QoS level to be applied to the packet in the respective egress interface, to allocate a space in the buffer for storage of a single copy of the multicast packet, to replicate and transmit multiple copies of the stored copy of the multicast packet through the egress interfaces, to maintain a count of the replicated copies that have been transmitted, and when the count reaches the identified number, to release the allocated space in the buffer,
wherein the packet processing logic is configured to transmit the multiple copies at two or more different levels of quality of service (QoS), such that a first number of the copies is transmitted at a first level of the QoS and a second number of the copies is transmitted at a different, second level of the QoS, and
wherein the packet processing logic is configured to count the replicated copies of the packet that have been transmitted respectively at the first and second levels of the QoS, with separate respective counters, and to release the allocated space when both the first and second numbers of the copies have been transmitted.

2. The apparatus according to claim 1, wherein the packet processing logic is configured, upon receipt of the multicast packet, to set a counter to a value corresponding to the specified number of the egress interfaces, and to decrement the value when the last of the replicated copies is transmitted.

3. The apparatus according to claim 1, wherein the packet processing logic comprises:
multiple packet transmission units, which are coupled respectively to the interfaces and are configured to read the stored copy of the multicast packet from the buffer and replicate the copies of the multicast packet for transmission through the egress interfaces; and
a central buffer management unit, which is configured to receive signals from the packet transmission units upon the transmission of the copies through the egress interfaces and to maintain the count responsively to the received signals.

4. The apparatus according to claim 3, wherein the generated descriptors are indicative respectively of the copies of the multicast packets that are to be transmitted through the egress interfaces and the packet processing logic is configured to queue the descriptors in respective queues for execution by the packet transmission units.

5. The apparatus according to claim 1, wherein the packet processing logic is configured, upon receipt of a unicast packet through one of the interfaces, to allocate a further space in the buffer for storage of the unicast packet, along with the space allocated for the single copy of the multicast packet, and when the unicast packet has been transmitted through a designated egress interface, to release the allocated further space in the buffer.

6. A method for communication, comprising:
receiving a multicast packet from a network through an ingress interface of a network element;
allocating a space in a buffer in the network element for storing a single copy of the multicast packet;
identifying a number of egress interfaces of the network element through which respective copies of the multicast packet are to be transmitted;
generating for each of the identified egress interfaces a descriptor including a quality of service (QoS) index value indicating a QoS level to be applied to the packet in the respective egress interface;
replicating and transmitting multiple copies of the stored copy of the multicast packet through the egress interfaces, while maintaining a count of the replicated copies that have been transmitted; and
releasing the allocated space in the buffer when the count reaches the identified number,
wherein replicating and transmitting the multiple copies comprises transmitting the multiple copies at two or more different levels of quality of service (QoS), such that a first number of the copies is transmitted at a first level of the QoS and a second number of the copies is transmitted at a different, second level of the QoS, and maintaining the count of the replicated copies of the packet that have been transmitted respectively at the first and second levels of the QoS, with separate respective counters, and
wherein the allocated space is released when the first and second numbers of the packets have respectively been transmitted.

7. The method according to claim 6, wherein identifying the number of the egress interfaces comprises, upon receipt of the multicast packet, setting a counter to a value corresponding to the specified number of the egress interfaces, and
wherein maintaining the count comprises decrementing the value when the last of the replicated copies is transmitted.

8. The method according to claim 6, wherein replicating and transmitting the multiple copies comprises reading the stored copy of the multicast packet from the buffer by multiple packet transmission units, which are coupled respectively to the egress interfaces, and replicating the copies of the multicast packet in the packet transmission units for transmission through the egress interfaces, and
wherein maintaining the count comprises receiving, in a central buffer management unit, signals from the packet transmission units upon the transmission of the copies through the egress interfaces and counting the replicated copies responsively to the received signals.

9. The method according to claim 8, wherein replicating and transmitting the multiple copies comprises queuing the descriptors in respective queues for execution by the packet transmission units, and
wherein identifying the number of the egress interfaces comprises counting the descriptors.

10. The method according to claim 6, and comprising, upon receipt of a unicast packet through one of the interfaces, allocating a further space in the buffer for storage of the unicast packet, along with the space allocated for the single copy of the multicast packet, and when the unicast packet has been transmitted through a designated egress interface, releasing the allocated further space in the buffer.

* * * * *